(12) United States Patent
Chai et al.

(10) Patent No.: US 9,001,927 B2
(45) Date of Patent: Apr. 7, 2015

(54) TRANSMITTING A WIRELESS SIGNAL BASED ON DETECTED SIGNAL INTERFERENCE

(71) Applicant: Hewlett-Packard Development Company, L.P., Houston, TX (US)

(72) Inventors: Eugene Chai, Ann Arbor, MI (US); Jung Gun Lee, Mountain View, CA (US); Sung-Ju Lee, Redwood City, CA (US); Raul Hernan Etkin, Sunnyvale, CA (US); Kang Shin, Ann Arbor, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 13/755,694

(22) Filed: Jan. 31, 2013

(65) Prior Publication Data

US 2014/0211883 A1 Jul. 31, 2014

(51) Int. Cl.
*H04L 1/00* (2006.01)

(52) U.S. Cl.
CPC .................................. *H04L 1/0034* (2013.01)

(58) Field of Classification Search
None
See application file for complete search history.

(56) References Cited

U.S. PATENT DOCUMENTS

| | | | |
|---|---|---|---|
| 6,255,967 B1 | 7/2001 | Norrell et al. | |
| 6,343,101 B1 | 1/2002 | Dong et al. | |
| 8,737,448 B2* | 5/2014 | Yun et al. | 375/135 |
| 2002/0041637 A1* | 4/2002 | Smart et al. | 375/316 |
| 2007/0202816 A1* | 8/2007 | Zheng | 455/91 |
| 2008/0125050 A1* | 5/2008 | Yen et al. | 455/67.11 |
| 2008/0291985 A1 | 11/2008 | Adnani et al. | |
| 2010/0075704 A1 | 3/2010 | McHenry et al. | |
| 2010/0105332 A1* | 4/2010 | McHenry et al. | 455/62 |
| 2012/0314630 A1 | 12/2012 | Walker et al. | |

OTHER PUBLICATIONS

Sutton, P., Rendezvous and Coordination in OFDM-based Dynamic Spectrum Access Networks, University of Dublin, Trinity College, (Research paper), 2008.

Tonelli, O., Analysis of Selected Implementation Issues of a Dynamic Spectrum Allocation Algorithm for OFDM System, Aalborg University (Research paper), 2009.

* cited by examiner

*Primary Examiner* — Hassan Phillips
*Assistant Examiner* — Ayanah George
(74) *Attorney, Agent, or Firm* — Mahamedi Paradice Kreisman

(57) ABSTRACT

A computing device can determine a radio frequency (RF) bandwidth in which one or more frames are to be transmitted by the computing device. The RF bandwidth is within the operating transmission bandwidth of the computing device. A signal interference having an interference bandwidth can interfere with the transmission of the one or more frames. In response to detecting the signal interference, one or more frames can be transmitted within the operating transmission bandwidth and not within the interference bandwidth.

13 Claims, 7 Drawing Sheets

TRANSMITTING A WIRELESS SIGNAL BASED ON DETECTED SIGNAL INTERFERENCE

BACKGROUND

Typical computing devices are primarily designed to use static, monolithic spectra for wireless communications. These computing devices, such as 802.11 devices (e.g., devices governed by the IEEE 802.11 family of standards), can suffer significant performance degradation due to signal interference.

DETAILED DESCRIPTION

Figure 1:
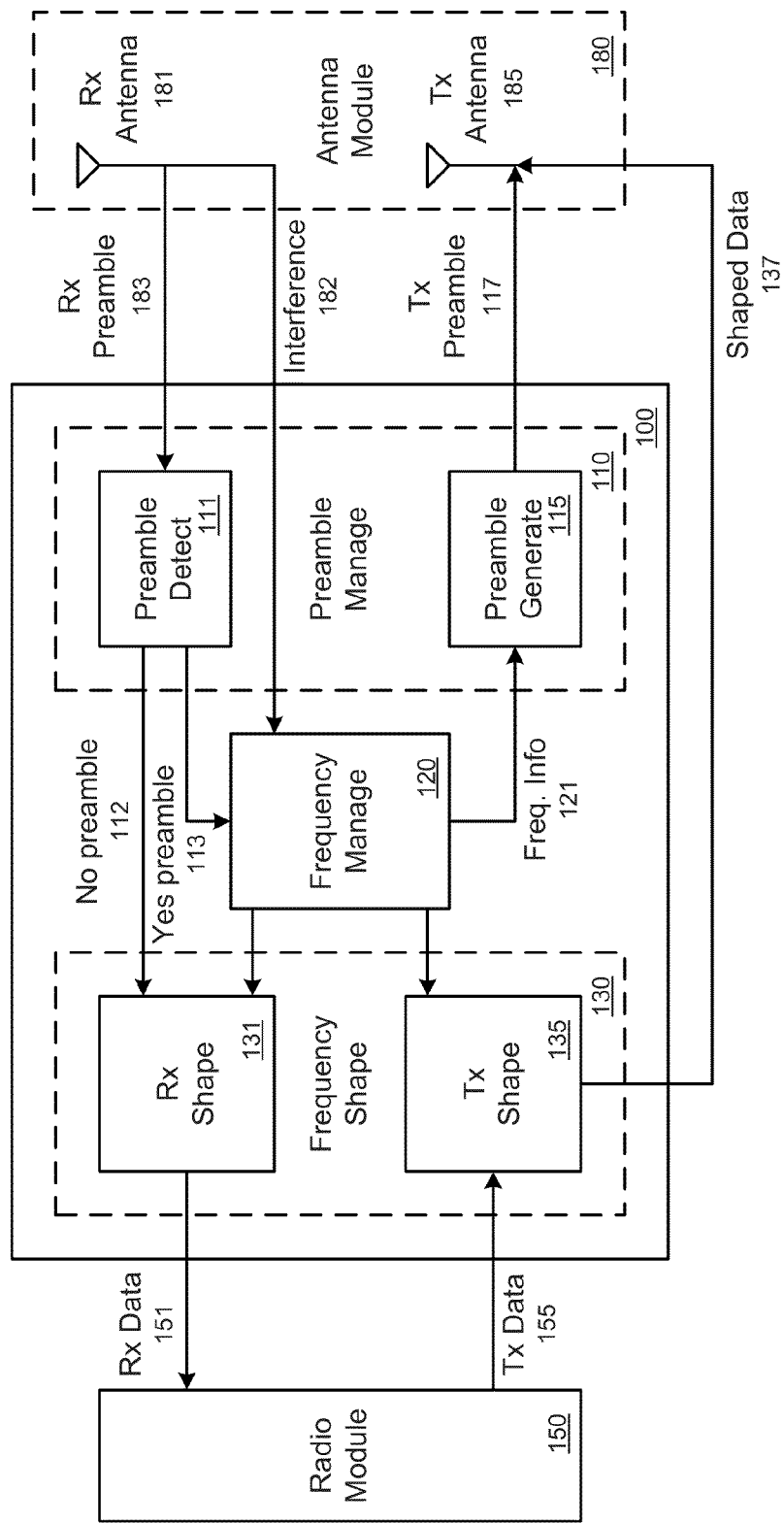
FIG. 1 illustrates an example system for shaping a frequency bandwidth of a frame.

Examples described herein provide for a system and method to dynamically shape or after the radio frequency (RF) bandwidth (or spectrum) of a data frame that is to be wirelessly transmitted from a computing device in response to detecting signal interference (e.g., provide for spectrum agility). In one implementation, by dynamically shaping the frequency bandwidth of the data frame, inefficiencies due to signal interferences can be reduced during transmission and/or reception of wireless signals.

Examples as described herein further recognize that a contiguous block of usable spectrum can be difficult to obtain as a result of spectrum allocation. There is spectrum scarcity in wireless networks, and as a result, devices that are designed to use a monolithic block of spectrum cannot increase throughput by simply increasing their bandwidths. For example, the throughput of a device (e.g., such as an 802.11n device) operating at 40 MHz can actually be lower than its throughput at 20 MHz when encountering a 20 MHz interference from another device (e.g., another 802.11n device or 802.11g device). Other performance anomalies can exist when rate or bandwidth is increased in an attempt to increase throughput in an overcrowded spectrum.

In one implementation, a computing device can determine an RF bandwidth (e.g., a spectrum band) in which one or more frames of data is to be transmitted to another computing device. The RF bandwidth can be within an operating transmission bandwidth of the computing device. The computing device can detect a signal interference that can interfere with the transmission of the one or more frames (e.g., a narrowband interference), where such signal interference has an interference bandwidth that is within the RF bandwidth. In response to detecting the signal interference, the computing device can transmit the one or more frames within the operating transmission bandwidth and not within the interference bandwidth. For example, the computing device can shape the spectrum band of a frame into multiple spectrum sub-bands to avoid the detected interference.

The computing device can include programmable hardware or a hardware extension that is connected to the antenna module (e.g., one or more antennas) and the radio device or radio module of the computing device (e.g., a commercial off-the-shelf device for RF transmission and/or reception). The programmable hardware or the hardware extension can connect directly to the antenna port(s) of the radio device to receive an unmodified signal from the radio device before dynamically altering the shape of the spectrum band. In this manner, the antenna module and the radio device of the computing device themselves do not have to be modified in order to transform the computing device to be a spectrum-agile device.

Still further, in some examples, the computing device can shape the spectrum band on a frame-by-frame basis. The computing device can dynamically shape or after the RF bandwidths of data frames as the frequency bandwidth(s) of the signal interference(s) change. For example, the computing device can detect a signal interference, transmit a first frame in a first set of spectrum sub-bands to avoid the signal interference, detect another signal interference at different interference bandwidth, and then transmit a second frame in a second set of spectrum sub-bands to avoid the second signal interference.

In another example, the computing device can generate a preamble to transmit with the shaped frame to notify a receiving device of the spectrum band or sub-bands in which the shaped frame is transmitted. The shaped frame can only be decoded if the spectrum band or sub-bands occupied by the shaped frame is known by the receiving device. The receiving device can use the preamble, which provides the necessary spectrum information of the shaped frame, to tune to the appropriate frequency bandwidths in order to receive the shaped frame.

As used herein, the terms WLAN and Wi-Fi can include communications governed by the IEEE 802.11 family of standards (e.g., 802.11ac, 802.11n, etc.), Bluetooth, HiperLAN (a set of wireless standards, comparable to the IEEE 802.11 standards, used primarily in Europe), and other technologies having relatively short radio propagation range.

Examples described herein provide that methods, techniques, and actions performed by a computing device are performed programmatically, or as a computer-implemented method. Programmatically, as used herein, means through the use of code or computer-executable instructions. These instructions can be stored in one or more memory resources of a computing device or a wireless access point. A programmatically performed step may or may not be automatic.

One or more examples described herein can be implemented using programmatic modules or components. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices, such as mobile computing devices, access points, desktop computers, cellular or smart phones, laptop computers, servers, or routers. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines or devices shown with examples herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, wireless APs) are all examples of machines and devices that utilize processors, memory, and instructions stored on computer-readable mediums. Additionally, some examples may be implemented in the form of computer-programs, or a computer usable carrier medium capable of carrying such a program.

System Description

FIG. 1 illustrates an example system for shaping a frequency bandwidth of a frame. A system 100, such as described by an example of FIG. 1, can be implemented on a computing device that performs wireless communications via Wi-Fi or through cellular networks. System 100 can be implemented on programmable hardware or a hardware extension to a radio module 150 (e.g., a commercial off-the-shelf (COTS) radio device). In one example, system 100 can be implemented with or as part of a radio module 150 so that system 100 can dynamically shape the frequency bandwidth of a data frame provided by the radio module 150 based on the existence of signal interference. System 100 can also receive shaped frames of data from a transmitting device and decode the frames appropriately.

Transmission

According to some examples, system 100 can include a preamble manage 110, a frequency manage 120, and a frequency shape 130. System 100 can be connected to the antenna port(s) of the radio module 150 and an antenna module 180 of a computing device. The antenna module 180 can include one or more antennas, such as a receiving (Rx) antenna 181 and a transmitting (Tx) antenna 185. Depending on implementation, the antenna module 180 can have more than two antennas and/or can include different types of antennas. The preamble manage 110, the frequency manage 120, and the frequency shape 130 combine to alter the spectrum band of a frame of data from the radio module 150 based on detected signal interference.

The radio module 150 can operate in an operating transmission bandwidth in order to transmit and/or receive wireless communications. This operating transmission bandwidth can vary depending on different standards and/or protocols that the radio module 150 operates under. In some cases, the radio module 150 can operate in the same operating transmission bandwidth as other devices. For example, the radio module 150 can operate under the 802.11ac protocol in a 160 MHz operating bandwidth (at 5 GHz) and share the same 5 GHz band with other devices operating under narrower bandwidths (e.g., a device operating under the 802.11a protocol in a 20 MHz operating bandwidth also at 5 GHz). As a result, when the transmitting device attempts to transmit a wireless signal in a radio frequency (RF) bandwidth within the operating bandwidth, narrowband interference due to other devices communicating in the same shared operating bandwidth can cause the receiving device to have problems when attempting to receive the wireless signal from the transmitting device. System 100 can be implemented on the transmitting device, for example, to alter the RF bandwidth of a frame of data to be transmitted if signal interference is detected.

In some examples, the frequency manage 120 can monitor (e.g., periodically, when frames of data are to be sent, or any time frames are not being transmitted), via the Rx antenna 181 (or other antenna(s) of the antenna module 180), for signal interference (e.g., narrowband interference). By monitoring the Rx antenna 181, the frequency manage 120 can determine if and when other computing devices are transmitting wireless signals that can interfere with the transmission of a wireless signal from the radio module 150 to a receiving device (e.g., another computing device, a base station, a router, etc.). When the frequency manage 120 detects and determines that the signal interference 182 is within the RF bandwidth of one or more frames of data that is to be transmitted by the computing device, the frequency manage 120 can indicate to the transmission (Tx) shape 135 that the RF bandwidth of the data frame(s) should be shaped so that the data frame(s) can be transmitted (1) within the operating bandwidth, and (2) not within the interference bandwidth. The frequency manage 120 can select appropriate bandwidths (e.g., a set of sub-bands within the operating bandwidth) in which to transmit the data frame(s) to avoid the bandwidth(s) occupied by the signal interference. In some implementations, the selected bandwidths can be multiple discontiguous frequency bandwidths within the operating bandwidth.

The Tx shape 135 can receive the one or more frames of data (e.g., the wireless signal) to be transmitted (Tx data 155) from the radio module 150, and shape the RF bandwidth of the frame(s) so that the data frame can be transmitted within the operating bandwidth and not within the interference bandwidth. The Tx shape 135 can shape the RF bandwidth of the frame(s) so that the overall RF bandwidth remains constant, but the frame(s) can be transmitted in different available bands (or unoccupied bands) within the operating bandwidth. The shaped data frame(s) 137 can be transmitted via the Tx antenna 185 of the antenna module 180. In some examples, the altering or shaping of the RF bandwidth of the frame(s) may be based on processes such as described below by an example of FIGS. 2 through 4.

In some implementations, the Tx shape 135 can continue to shape the RF bandwidth of the data frame(s) 155 (e.g., in real-time) until the frequency manage 120 signals to the Tx shape 135 that the RF bandwidth no longer needs to be shaped. For example, the frequency manage 120 can detect that the signal interference no longer exists and/or is no longer within the original RF bandwidth (before shaping), so that shaping is no longer necessary.

When the Tx shape 135 is notified that the RF bandwidth of the data frame(s) do not need to be shaped, the Tx data 155 can be forwarded by the Tx shape 135 to the Tx antenna 185 without processing the data frame. In other variations, the frequency manage 120 can detect additional signal interference(s) and/or that the previously detected signal interference is at a different narrowband frequency bandwidth. In such cases, the frequency manage 120 can then indicate to the Tx shape 135 that the RF bandwidth of the data frame(s) 155 should be shaped differently. In this manner, the frequency manage 120 and the Tx shape 135 can shape the RF bandwidth of each data frame, if necessary (e.g., frame-by-frame basis), while keeping the overall RF bandwidth constant.

Preamble

When system 100 shapes a data frame(s) and transmits the shaped data frame(s) 137 via the Tx antenna 185, a receiving computing device needs to be able to detect and receive the shape data frame(s) 137 at the appropriate RF bandwidth (or sub-bands). In one implementation, a shaped data frame that is transmitted by the computing device implementing system 100 can be decoded only if the RF bandwidths occupied by the data frame is known by the receiving computing device. In situations where the RF bandwidth occupancy of the frame is unknown, the receiving computing device can attempt to search for the frame over all of the sub-bands of the operating bandwidth. However, in such cases, the attempt to search for the frame can be time consuming and inefficient (e.g., consume too much energy). In addition, from a view point of a receiving computing device, multiple transmitting devices can transmit a data frame at one time. The receiving computing device should be able to determine which sub-bands are assigned to which transmitting devices.

In order for a receiving computing device (which implements a similar system as system 100) to properly receive the shaped frame(s) from system 100, system 100 uses a unique preamble to provide spectrum information to the receiving computing device for fast spectrum agreement. In one example, this preamble can be a mufti-sub-band preamble that is transmitted before a shaped data frame. Because a shaped data frame can include a (1) a standard preamble, and (2) the data for the frame, the preamble to provide spectrum information can be referred to as the in-front of preamble (I-FOP) preamble. An I-FOP preamble can indicate to the receiving device both the start of a shaped frame as well as the spectrum sub-bands the I-FOP preamble occupies. In some implementations, each shaped frame that is transmitted by system 100 has an I-FOP preamble that is pre-appended to the shaped frame.

When the frequency manage 120 determines that the RF bandwidth of a data frame needs to be shaped and selects appropriate bandwidth(s) (e.g., sub-bands) in which to transmit the data frame, the selected frequency bandwidth information 121 is provided to the preamble generate 115. The preamble generate 115 can construct an I-FOP preamble (e.g., Tx preamble 117) using the frequency information 121 so that the I-FOP preamble can be transmitted in the same sub-bands as the shaped data frame. Depending on implementation, the I-FOP preamble (e.g., Tx preamble 117) that is specific to and generated particularly for the shaped data frame 137 can then be transmitted before and/or pre-appended to the shaped data frame 137.

In some implementations, the preamble generate 115 creates an I-FOP preamble that is configured to (i) assign an address (or identifier) to each flow (where a flow corresponds to a group or set of consecutive frames that are sent by the radio module 150), (ii) specify the sub-bands occupied by a shaped frame within the operating bandwidth, and (iii) enable the receiver at the receiving device to recover both the address and sub-band occupancy information of each frame without prior coordination with system 100. For example, if a flow of data frames that are to be transmitted from the transmitting computing device to the receiving computing device includes six individual data frames, the flow can be addressed for the particular pair of the transmitting computing device and the receiving computing device. Even in a single flow of data frames, individual data frames can be shaped differently to occupy different sub-bands (within the operating frequency) to avoid sub-bands that are occupied by signal interference(s).

In one example, the I-FOP preamble that is generated by the preamble generate 115 should have a strong correlation property so that a receiver searching for the I-FOP preamble by performing correlations can encounter a large correlation peak only if the I-FOP preamble is present on the channel (or sub-band). The correlation property should also be valid for a large set of sequences of the same length so that a different I-FOP preamble can be assigned to each flow of data frames. In some examples, the preamble generate 115 can use Zadoff-Chu (ZC) sequences for the I-FOP preamble because ZC sequences have strong correlation properties.

In constructing the I-FOP preamble, the preamble generate 115 can select and use a set of ZC sequences to address a flow of one or more shaped frames from a transmitting system 100 of a transmitting computing device to a receiving system 100 of a receiving computing device. For example, if transmitting system 100 reshapes one or more frames to fit into four sub-bands (sub-bands A, B, D, E) out of six sub-bands of the operating bandwidth (where sub-bands C and F are unoccupied), the preamble generate 115 select four ZC sequences, P1 through P4 (e.g., out of a set of well-defined pseudo-noise sequences), and transmit P1 through P4 on the four sub-bands A, B, D, E). This set of ZC sequences (P1 through P4) can then be searched for and detected by a receiving system 100 of the receiving computing device once the wireless signal is received. Once the preamble generate 115 constructs construct an I-FOP preamble (e.g., Tx preamble 117) for the shaped data frame, the I-FOP preamble and the shaped data frame 137 can be transmitted to a receiving system 100 of a receiving computing device via the Tx antenna 185.

As an addition or an alternative, the preamble generate 115 can also apply a random cyclic shift to each ZC sequence before constructing the I-FOP preamble. The set of ZC sequences can be transmitted on the same sub-bands occupied by the shaped frame or the flow of shaped frames within the operating bandwidth. In one example, each of the ZC sequences can also be different sequences in order to avoid misdetections as a result of spectrum leakage between adjacent sub-bands.

Reception

System 100 can also include a preamble detect 111 as part of the preamble manage 110, and a reception (Rx) shape 131 as part of the frequency shape 130. The preamble detect 111, the frequency manage 120, and the Rx shape 131 can combine to receive and process a shaped frame of data that is transmitted by a transmitting computing device. As discussed, system 100 (or a similar system) can also be implemented on a receiving computing device to receive shaped frames from a transmitting device. For purposes of discussing system 100 receiving data frames (as opposed to transmitting data frames), system 100 of FIG. 1 is referred to in the view point of a receiving computing device.

A receiving (Rx) antenna 181 of the antenna module 180 of a receiving computing device can receive the wireless signal from a transmitting computing device. The preamble detect 111 can determine whether the received wireless signal includes a Rx preamble 183 (e.g., an I-FOP preamble of a shaped data frame). According to an implementation, the preamble detect 111 can detect an I-FOP preamble based on at least three properties: (i) the set of sequences (e.g., ZC sequences) of the I-FOP preamble, (ii) the order of the sequences, and (iii) the arrival time of the set of sequences.

The preamble detect 111 can detect the set of ZC sequences, for example, by searching all sub-bands of the operating bandwidth for the set of ZC sequences (e.g., by using prior negotiated information with the transmitting computing device). The ZC sequences (and the order of the ZC sequences) can address a flow of data frames that are to be received by the receiving computing device from the transmitting computing device (e.g., address a flow between the receiving system 100 and a transmitting system 100). This may be important as a receiving device may detect transmitted wireless signals from more than one transmitting device. By knowing the addresses of the flows for the paired transmitting and receiving devices, the correct data can be recovered from the received frames.

In addition, the preamble detect 111 can have information that identifies the order of the ZC sequences. Not only should the preamble detect 111 find the ZC sequences, but the ZC sequences should be identified to be in a particular order that matches the order of a known set of ZC sequences. The preamble detect 111 can also detect the ZC sequences based on the arrival time of the sequences on the different sub-bands. For example, typically, multiple ZC sequences sent by the same transmitting device as part of a single I-FOP preamble will arrive at the Rx antenna 181 at approximately the same time. A threshold can be used by the preamble detect 111 to limit the range of separation between peaks (e.g., where a peak represents a ZC sequence at a sub-band) on the different sub-bands where the ZC sequences are found, so that only set of correlation peaks that are within the threshold apart are considered as candidates for the I-FOP preamble.

For example, referring back to the previous example, where an I-FOP preamble was generated with four ZC sequences (P1 through P4) and transmitted on four sub-bands A, B, D, E from a transmitting computing device, the preamble detect 111 of a receiving computing device can search for each of P1 through P4 in each sub-band of the operating bandwidth in order to correlate each sub-band with one of the ZC sequences (P1 through P4). The preamble detect 111 can identify which ZC sequences to search for based on previously exchanged information or based on programmable information stored in a database of system 100. For example, a transmitting computing device and a receiving computing device can be configured to exchange information with each other by implementing a negotiation process (e.g., associate with each other).

In another example, the preamble detect 111 can identify which ZC sequences to search for based on an exchange of an association frame between the receiving system 100 of the receiving computing device and the transmitting system 100 of the transmitting computing device. An association frame is a control frame that is exchanged between the receiving system 100 of the receiving computing device and the transmitting system 100 of the transmitting computing device. In some implementations, the association frame can be spectrally shaped (like the data frames) and pre-appended with a preamble that is constructed using a fixed set of ZC sequences. This fixed set of ZC sequences in the preamble of the association frame is the association set and can be pre-programmed in a database of system 100 (and in databases of other devices implementing system 100 or similar systems). The payload of the association frame can contain the identifiers of all the ZC sequences and the order in which the ZC sequences will be used. System 100 of the receiving device, via the preamble detect 111 and the frequency manage 120, can obtain the ZC sequence information used to address the flow of data frames from the transmitting system 100 to the receiving system 100.

Once the ZC sequences of the I-FOP preamble 113 are detected on the sub-bands, the preamble detect 111 can select the sub-bands that the correlation peaks are found on and provide the information to the frequency manage 120. The frequency manage 120 can cause the Rx shape 131 to adjust one or more components, such as the filters and/or modulators, in order to recover the data frame from the RF signal found on the selected sub-bands. Once the data frame is recovered by the Rx shape 131 (e.g., is re-shaped back), the received data 151 is provided to the radio module 150 for further processing on the receiving computing device. If no preamble 112 is detected by the preamble detect 111 (e.g., the transmitted data frame was not spectrally-shaped), the preamble detect can indicate to the Rx shape 131 that no re-shaping of the RF signal is necessary and forward the data frame to the radio module 150.

In this manner, system 100 can communicate with other similar systems to exchange spectrally-shaped data in order to reduce inefficiencies during transmission as a result of signal interferences. System 100 provides frame-by-frame spectrum shaping to react to unexpected transmission (e.g., signal interferences) by other devices. Neither the COTS radio device nor the software-defined radios (SDRs) of a computing device are individually capable of supporting the per-frame spectrum shaping. Other benefits of system 100 include a direct connection to a COTS radio device, so that the radio devices themselves do not have to be modified, but can gain spectrum agility with the addition of system 100. In addition, the current wireless protocols of the COTS radio devices do not have to be modified.

System 100 also allows for fast spectrum agreement between the transmitting system and a receiving system. As discussed, the transmitting system and the receiving system need to agree on a common set of spectrum sub-bands (and possibly non-contiguous sub-bands) before commencing transmission of shaped frames. The preamble generation and detection of system 100 enables a transmitting system and a receiving system to quickly allow for spectrum agreement by notifying a receiving system of the spectrum occupied by the accompanying shaped frame. In addition, the use of the I-FOP preamble can eliminate the need for a separate control channel, backup channel lists, or a centralized spectrum coordinator.

Methodology

Figure 2:
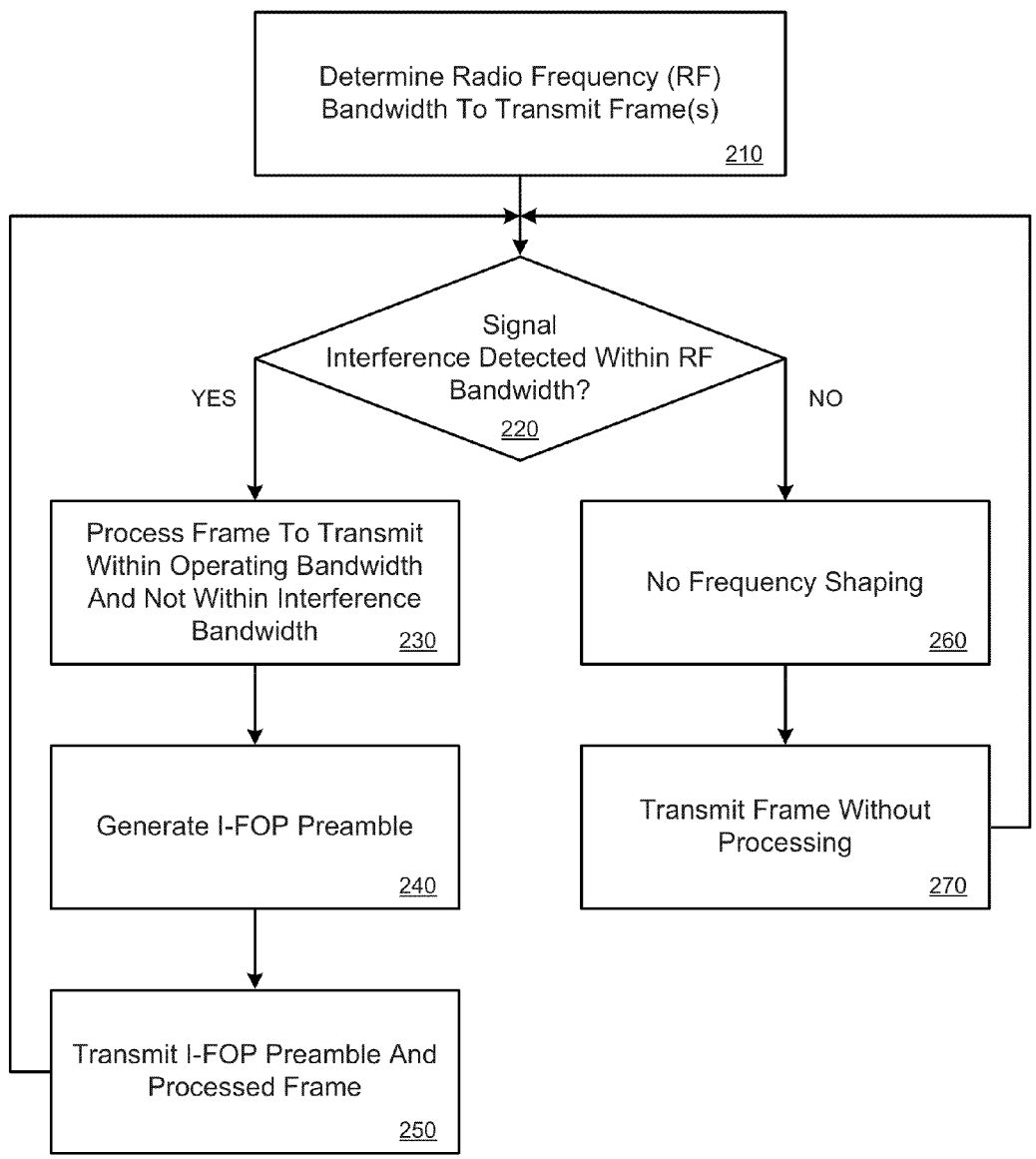
FIG. 2 illustrates an example method for shaping a frequency bandwidth of a frame.

FIG. 2 illustrates an example method for shaping a frequency bandwidth of a frame. A method such as described by FIG. 2 can be implemented using, for example, a system and components such as described with FIG. 1. Accordingly, references made to elements of FIG. 1 are for purposes of illustrating a suitable element or component for performing a step or sub-step being described.

The RF bandwidth in which one or more frames of data is to be transmitted is determined (210). In one example, a system that shapes an RF bandwidth of a frame, such as system 100 as described in FIG. 1, determines the RF bandwidth by communicating with components of a computing device that implements system 100. System 100 can be implemented on programmable hardware or a hardware extension to a radio module 150 (e.g., a COTS radio device) of a computing device and/or can be implemented with or as part of the radio module 150 of the computing device. In some implementations, the RF bandwidth in which one or more frames are to be transmitted can depend on different standards and/or protocols that the radio module 150 operates under (e.g., under an 802.11 protocol).

The system determines whether signal interference (e.g., narrowband interference) is detected within the RF bandwidth in which the one or more frames is to be transmitted (220). For example, the frequency manage 120 can monitor, via a receiving antenna, for signal interference. In another example, the frequency manage 120 can monitor for signal interference intermittently at particular instances (e.g., in response to receiving data to be transmitted to another device from the radio module 150) or periodically. If the frequency manage 120 detects and determines that signal interference (having an interference bandwidth) overlaps or is within the determined RF bandwidth, the frequency manage 120 can indicate to system 100 and the Tx shape 135, for example, that the bandwidth of one or more data frames should be shaped. The frequency manage 120 can select appropriate bandwidths (e.g., a set of sub-bands within the operating bandwidth) in which to transmit the data frame(s) to avoid the bandwidth occupied by the signal interference, and the Tx shape 135 can process the individual frame(s) to be transmitted within the operating bandwidth and not within the interference bandwidth (230).

In one example, the frequency manage 120 can select the sub-bands by choosing the sub-bands that have the lowest energy levels at the point of frame transmission. A Fast Fourier Transform (FFT)-based energy detector can be used to take the FFT of incoming signals and measuring the magnitude of the energy in each subcarrier. In other examples, the frequency manage 120 can implement spectrum-scanning techniques to detect occupied sub-bands and to determine the protocol occupying them. According to some implementations, by spectrum-scanning techniques, system 100 can predict future usage patterns of the interfering devices (e.g., devices that cause the signal interference).

Using the frequency information of the selected bandwidths (e.g., sub-bands within the operating bandwidth) in which to shape the one or more data frames, the preamble generate 115 can construct an I-FOP preamble for each of the shaped frames (240). The I-FOP preamble can indicate to the receiving device both the start of the shaped frame as well as the spectrum sub-bands the I-FOP preamble occupies. In one example, the preamble generate 115 can construct the I-FOP preamble by selecting and using a set of ZC sequences to address a flow of the shaped frame(s) from a transmitting system to a receiving system.

Depending on implementation, the frame(s) can be processed concurrently while the I-FOP preamble is generated. In some examples, the I-FOP preamble can be generated in response to the frequency manage 120 detecting that signal interference is within the RF bandwidth in which the one or more frames is to be transmitted. As an addition or an alternative, the I-FOP preamble can be generated before the frame(s) are processed.

Each of the I-FOP preamble(s) and the corresponding processed frame(s) can be transmitted to the receiving device (e.g., via one or more transmission antennas) (250). In one implementation, the I-FOP preamble is pre-appended to the corresponding shaped frame and is transmitted together. In other examples, the I-FOP preamble can be transmitted first before transmitting the shaped frame (e.g., transmit the I-FOP preamble while the corresponding frame is being shaped). The shaped frame can be transmitted after the I-FOP preamble transmission is complete. The transmitting system can continue to transmit frames and when necessary (due to signal interference within the RF bandwidth), dynamically shape frames until the radio module of the transmitting device stops providing transmission data.

Referring back to (220), if the frequency manage 120 detects no signal interference at the time of transmission or determines that the signal interference does not overlap or is not within the determined RF bandwidth, the frequency manage 120 can indicate to system 100 and the Tx shape 135, for example, that the RF bandwidth of one or more data frames does not need to be shaped (260). The frames can be transmitted to a receiving computing device without being shaped (270). The transmitting system can continue to transmit unshaped frames until necessary (e.g., until signal interference is detected within the RF bandwidth).

Figure 3A:
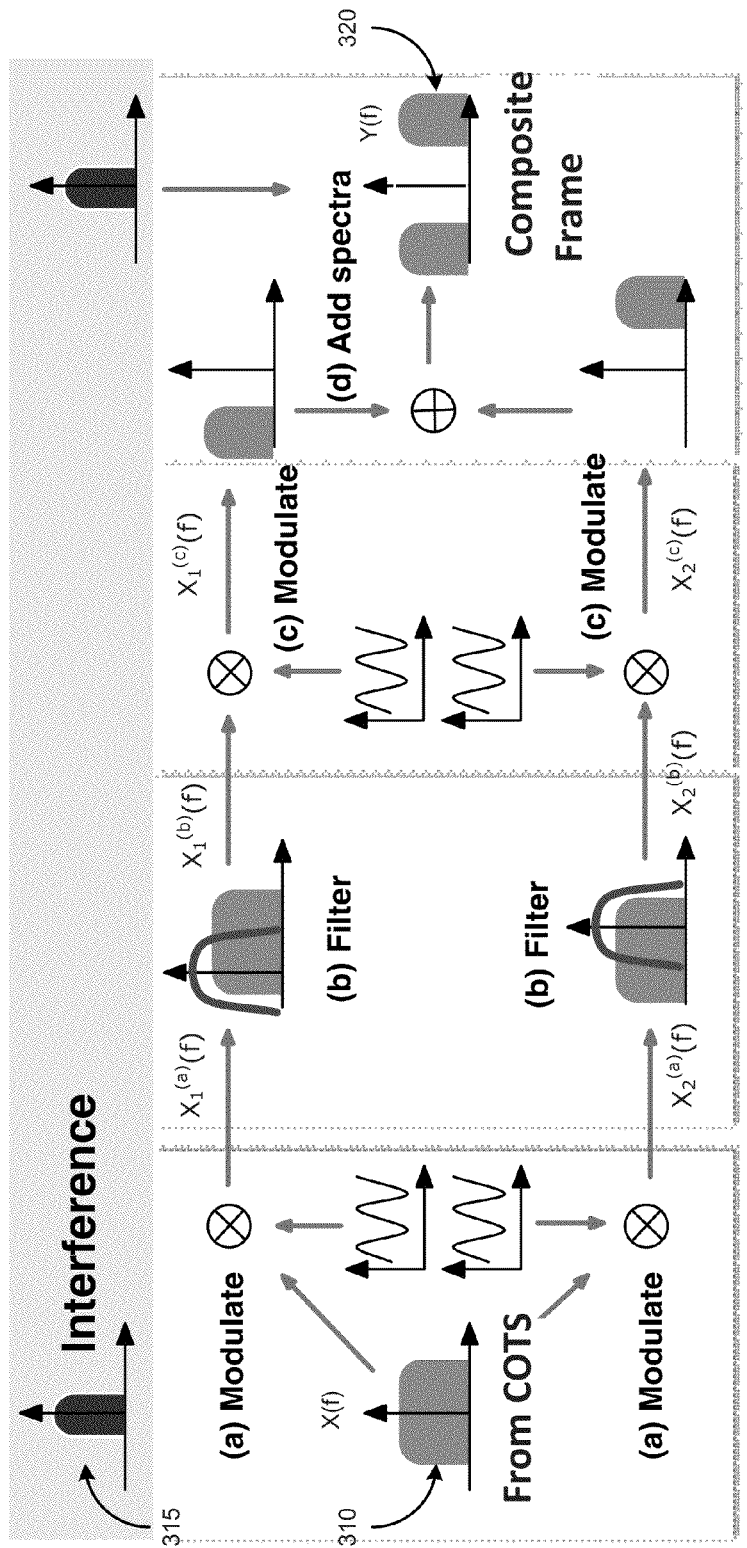
FIG. 3A illustrates an example of processing a frame for transmission in response to detecting signal interference.

FIG. 3A illustrates an example of processing a frame for transmission in response to detecting signal interference. A process such as described by FIG. 3 can be implemented using, for example, a system and components such as described with FIG. 1. Accordingly, references made to elements of FIG. 1 are for purposes of illustrating a suitable element or component for performing a step or sub-step being described.

In one example, the processing described in FIG. 3A can be performed by the Tx shape 135 of system 100 of FIG. 1. The Tx shape 135 can divide the total operating bandwidth (B) into a number of sub-bands (N), and shape the spectrum of a frame to occupy $N_F$ of the N sub-bands (where $N_F < N$). Although a two-band shaping process (where $N > N_F$, and $N_F = 2$) is described in FIG. 3A, for simplicity, this process can be extended to multi-band (more than two bands) shaping.

X(f) represents the original spectrum (or RF bandwidth) of a data frame 310 that is received by system 100 from the radio module 150 (e.g., the COTS device). In the example described, signal interference 315 at an interference bandwidth has been detected and determined to be within the RF bandwidth in which the data frame 310 is to be transmitted.

In some examples, the Tx shape 135 uses low-pass filters to shape the spectrum of the data frame 310. The input signal X(f) is first modulated to align the relevant portion of the input signal X(f) with the passband of the low-pass filter H(f). The Tx shape 135 takes the digitized RF signal 310 (e.g., a signal stream of the data frame) from the radio module 150 and makes a copy of it. In one example, the Tx shape 135 does not have to wait to receive the entire frame before processing the signal stream. Processing of the frame can occur as the signal stream of the frame is being received from the radio module 150. The Tx shape 135 takes each copy and modulates them (see (a) of FIG. 3A) so that half of each spectrum is at the baseband frequency. For example, $$m_1^{(a)}(t) = \exp\{j2\pi k_1 Bt/N\}, \text{ and} \quad \text{(Eq. 1)}$$

$$m_2^{(a)}(t) = \exp\{j2\pi k_2 Bt/N\}, \quad \text{(Eq. 2)}$$

is the time-domain complex-valued carrier used to modulate X(f), with $k_i = 0, \ldots, N-1$, and $\forall i = 1, 2$. The modulated spectrum is:

$$\begin{aligned} X_i^{(a)}(f) &= X(f) * \delta(f - k_i B/N) \\ &= X(f - k_i B/N), \forall i = 1, 2, \end{aligned} \quad \text{(Eq. 3)}$$

where $\delta(\bullet)$ is the Dirac delta function.

Once the spectrum X(f) of the data frame 310 has been modulated, in one example, low-pass filters are applied to each of $X_1^{(a)}(f)$ and $X_2^{(a)}(f)$ to isolate the upper and lower portions of the spectrum X(f) (see (b) of FIG. 3A). Depending on implementation, low-pass filters can be selected to be partially overlapping so that system 100 is tolerant of frequency drifts, such as described below by an example of FIG. 4 (e.g., the filtering process is non-destructive so that information of the original data frame 310 is not lost). For example, $H_1(f)$ and $H_2(f)$ correspond to the two low-pass filters that are applied to the modulated signal. The two spectral sub-bands as a result of the filters are $X_1^{(b)}(f)$ and $X_2^{(b)}(f)$, where:

$$X_i^{(b)}(f) = H_i(f)X_i^{(a)}(f) \qquad \text{(Eq. 4)}$$
$$= H_i(f)X(f - k_iB/N), \forall i = 1, 2.$$

After the low-pass filters are applied, each filtered sub-band should be transmitted at a frequency that encounters minimum interference. A post-filter modulation step (see (c) of FIG. 3A) shifts each of the spectrum sub-bands into the appropriate frequency to minimize interference from other transmitters, for example, based on the interference bandwidth of the detected signal interference. The post-filter modulation step can use, for example:

$$m_1^{(c)}(t) = \exp\{j2\pi I_1 Bt/N\}, \text{ and} \qquad \text{(Eq. 5)}$$
$$m_2^{(c)}(t) = \exp\{j2\pi I_2 Bt/N\}, \qquad \text{(Eq. 6)}$$

as the modulating carrier, where $I_1, I_2 = 1, \ldots, N$. This post-filter modulation step achieves, for $\forall i = 1, 2$:

$$X_i^{(c)}(f) = X_i^{(b)}(f) * \delta(f - I_iB/N) \qquad \text{(Eq. 7)}$$
$$= X_i^{(b)}(f - I_iB/N)$$
$$= H_i(f - I_iB/N)X(f - (I_i + k_i)B/N).$$

The two sub-bands are then combined to produce a single, spectrum-shaped frame (see (d) of FIG. 3A). In one example, the combined single shaped frame can be a non-contiguous frame. The Tx shape 135 can then provide the composite frame for transmission (e.g., be amplified and transmitted via a transmitting antenna). The composite frame 320 can be represented by:

$$Y(f) = X_1^{(c)}(f) \text{ and } X_2^{(c)}(f). \qquad \text{(Eq. 8)}$$

As illustrated in FIG. 3A, the composite frame occupies sub-bands that are not occupied by the interference bandwidth of the single interference 315.

Figure 3B:
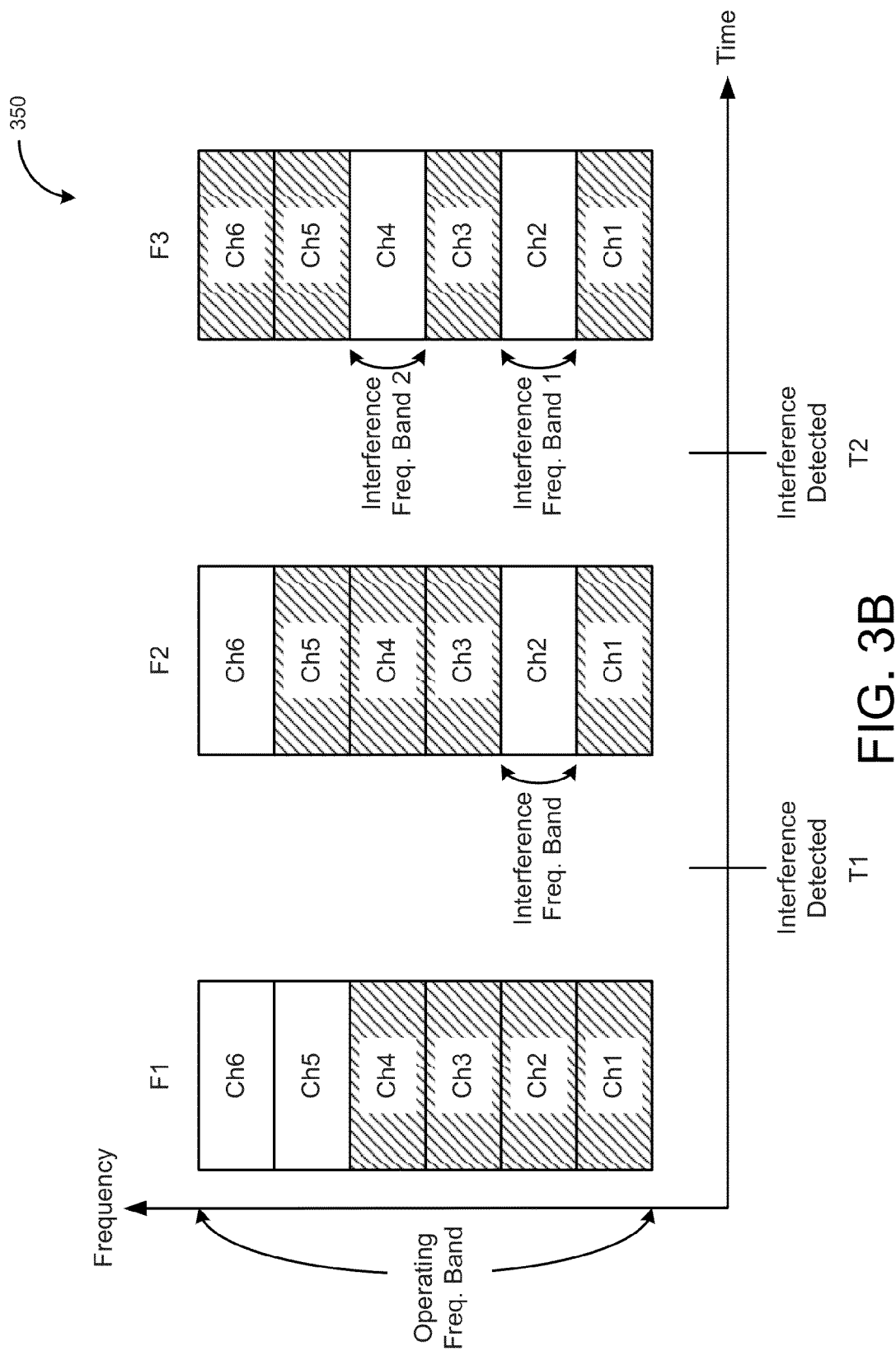
FIG. 3B illustrates a diagram of shaping a frequency bandwidth of a frame.

FIG. 3B illustrates a diagram of shaping a frequency bandwidth of a frame. The diagram illustrated in FIG. 3 can be implemented using, for example, a system and components such as described with FIG. 1. Accordingly, references made to elements of FIG. 1 are for purposes of illustrating a suitable element or component for performing a step or sub-step being described.

Diagram 350 illustrates three frames, F1, F2, and F3 that are transmitted by a system, such as system 100 of FIG. 1. Frame F1 illustrates the original RF bandwidth in which the data frame(s) are to be transmitted by a transmitting computing device. The original RF bandwidth covers four sub-bands ($N_F$=4) or four channels (Ch1 through Ch4) of the overall operating bandwidth. In one example, the overall operating bandwidth (B) is divided into a number of sub-bands (N), where in this diagram 350, N=6. N is also greater than $N_F$. When frame F1 is transmitted, the spectrum of the frame F1 is unshaped as no signal interference has been detected. As a result, frame F1 is transmitted on Ch1 through Ch4 with Ch5 and Ch6 being unoccupied.

At time T1, a signal interference is detected by system 100 (e.g., by the frequency manage 120). In this example, the signal interference is detected after the transmission of frame F1, but before the transmission of frame F2. The signal interference has been determined to be within the original RF bandwidth in which frame F2 is to be transmitted (e.g., interference is found on Ch2). As a result, the frequency manage 120 indicates to the Tx shape 135 that frame F2 needs to be shaped, and selects a set of sub-bands (within the operating bandwidth) in which frame F2 can be transmitted. The spectrum of F2 is mapped into the remaining available (e.g., unoccupied) sub-bands. In the example illustrated in diagram 350, the frequency manage 120 has selected sub-bands Ch1 and Ch 3 through Ch5 to avoid the sub-band occupied by the signal interference (e.g., avoid Ch2). As illustrated, in some implementations, the selected bandwidths can be multiple discontiguous frequency bandwidths within the operating bandwidth.

The Tx shape 135 processes the frame F2 in order to shape the RF bandwidth of the frame F2 in the manner specified. In some examples, the Tx shape 135 processes the frame F2 in the manner described in FIG. 3A. As illustrated in diagram 350, the Tx shape 135 can shape the RF bandwidth of frame F2 so that the overall RF bandwidth still remains constant ($N_F$=4). The shaped frame F2 can then be transmitted (e.g., with an I-FOP preamble) to a receiving computing device.

At time T2, the frequency manage 120 detects another signal interference within the RF bandwidth in which frame F3 is to be transmitted. In addition to the signal interference detected in Ch2, a second signal interference is detected in Ch4. In this example, the signal interferences are detected after the transmission of frame F2, but before the transmission of frame F3. Similarly, the frequency manage 120 indicates to the Tx shape 135 that frame F3 needs to be shaped, and selects a set of sub-bands in which frame F3 can be transmitted. In the example illustrated in diagram 350, the frequency manage 120 has selected sub-bands Ch1, Ch 3, and Ch5 through Ch6 to avoid the sub-bands occupied by the signal interferences (e.g., avoid Ch2 and Ch4). The Tx shape 135 processes the frame F3 in order to shape the RF bandwidth of the frame F3 in the manner specified by the frequency manage 120.

As a result, system 100 allows for frame-by-frame shaping to dynamically adjust the spectrum of frames in response to signal interferences. If frame-by-frame shaping is not used, a wideband transmission can be blocked by a narrowband transmission (e.g., signal interference), or a wideband transmission can collide with a narrowband transmission if the narrowband transmitter does not correctly detect the wideband transmission.

Figure 4:
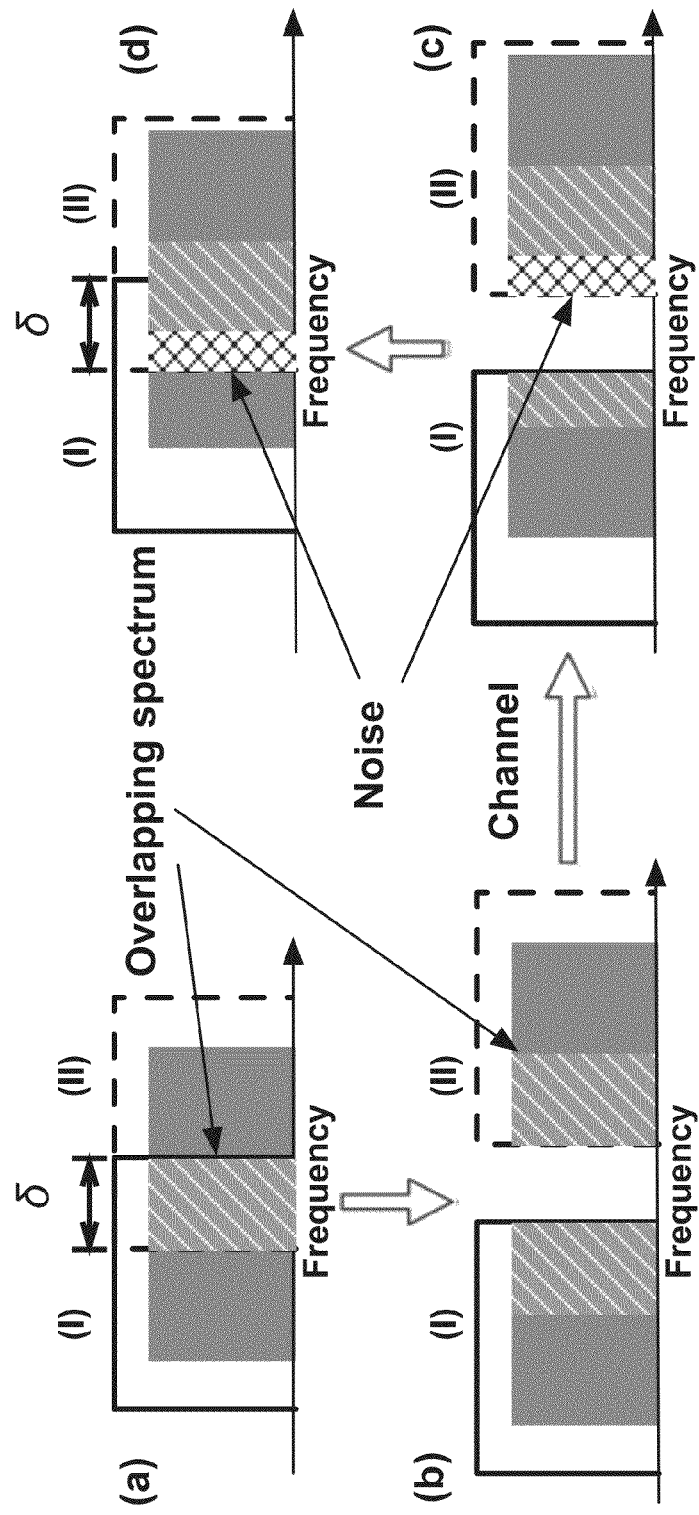
FIG. 4 illustrates a diagram of partially-overlapping filters for shaping a frequency bandwidth of a frame.

FIG. 4 illustrates a diagram of partially-overlapping filters for shaping a frequency bandwidth of a frame. As discussed with FIGS. 1 through 3B, system 100 can use one or more filters, such as low-pass filters, in order to shape the spectrum of a data frame. According to some implementations, the filters used by system 100 can be selected and/or adjusted to account for frequency offset between the transmitting computing device and the receiving computing device. The selection of the filters can enable system 100 to be resilient to frequency drifts by transmitting redundant spectral information through the user of partially overlapping filters. System 100 can also be tolerant of timing drifts because time synchronization is handled by the radio module or device 150 of the computing device as part of its physical layer protocol.

The diagram described in FIG. 4 illustrates two filters, filter (I) and filter (II), that share a common overlapping sub-band of bandwidth, δ (see (a) of FIG. 4). On the transmitting system 100 of the transmitting device, the filters (I) and (II) are designed to overlap by some amount, which should be at least as large as the upper bound on the frequency drift. In one example, the IEEE 802.11a standard specifies a frequency error tolerance of 20 ppm, so the overlapping bandwidth, δ, can be very small. When the two sub-bands are separated, each sub-band can contain a copy of the overlapping spectrum (see (b) of FIG. 4).

When a frequency drift occurs at the receiving computing device, both spectrum halves will be shifted by the same amount (see (c) of FIG. 4). In the first spectrum band, the shift will result in a loss of spectral information. In the other second spectrum band, all spectral information is present, but a band of noise is now introduced (e.g., added to it). When the two sub-bands are combined at the receiving system 100 of the receiving computing device, spectral information missing from the first spectrum band can be recovered from its redundant copy in the second spectrum band (see (d) of FIG. 4). As a result, the final spectrum will contain all the original spectrum information along with the added noise. The added noise has a minimal effect on the overall frame because it appears at the very edge of the shaping filter and is typically very narrow as frequency drifts can be very small.

In some examples, the degree of resilience of frequency drift is governed by the overlapping bandwidth, δ, which is a configuration parameter. The value chosen for δ should be greater than the expected frequency drift. In addition, the lower bound on the overlapping bandwidth, δ, can depend on the quality of the COTS radio device of the computing device that system 100 is connected to.

According to other implementations, a spectrum shaping filter should also possess (i) constant unit amplitude response and linear phase response in the passband, (ii) narrow transition bandwidth, and (iii) very high attenuation in the stopband. In one example, a constrained least squares algorithm can be used for the filter design. Using the constrained least squares algorithm, the filters can be configured to have, for example, 64 taps, a passband ripple of 0.1 dB, and an overlapping spectrum bandwidth that is approximately 10% of the total filter bandwidth.

Figure 5:
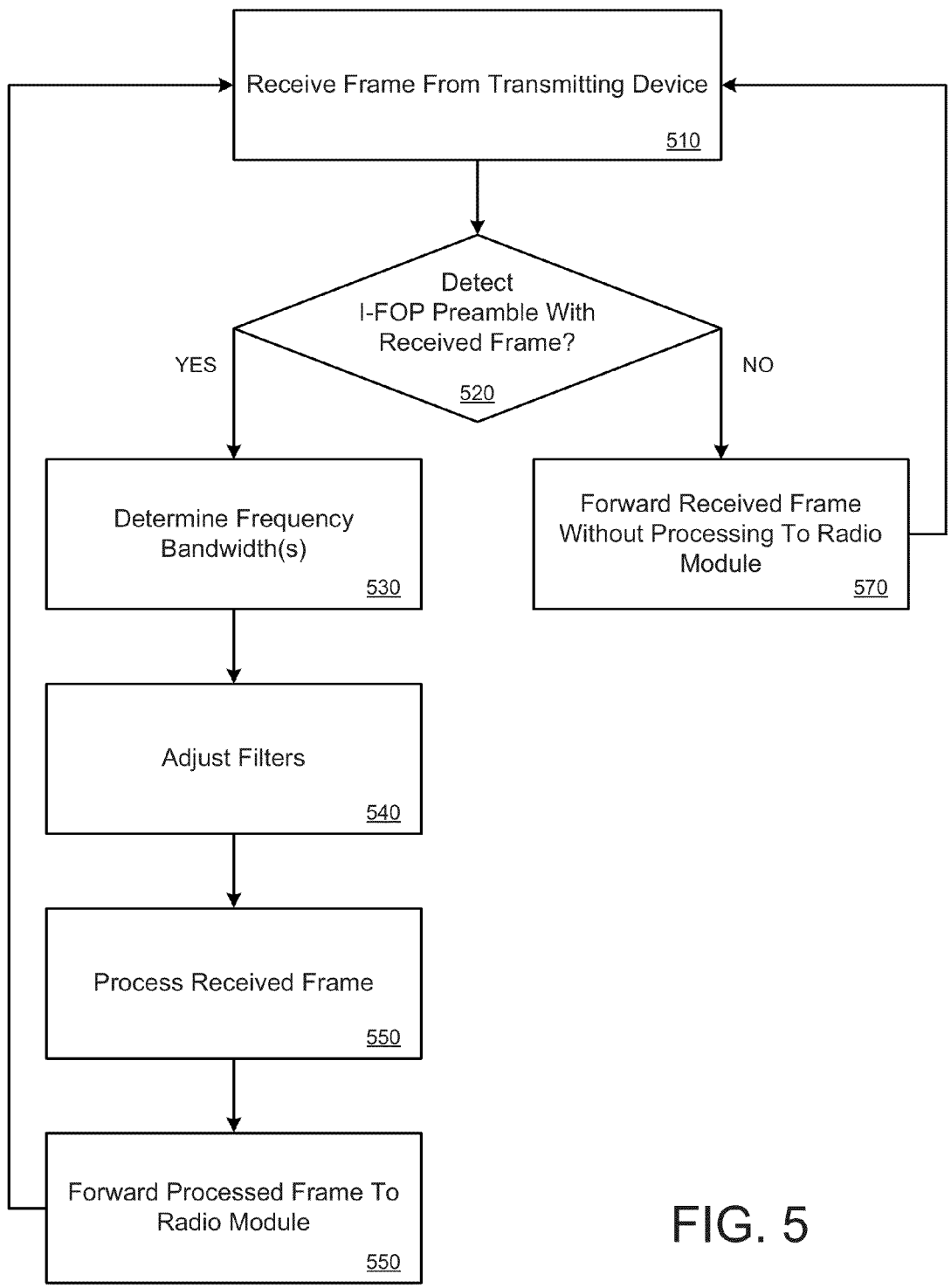
FIG. 5 illustrates an example method for receiving and processing a frame.

FIG. 5 illustrates an example method for receiving and processing a frame. A method such as described by FIG. 5 can be implemented using, for example, components described with FIG. 1. As discussed, system 100 (or a similar system) can also be implemented on a receiving computing device to receive shaped frames from a transmitting device. Accordingly, references made to elements of FIG. 1 are for purposes of illustrating a suitable element or component for performing a step or sub-step being described.

A frame can be received from a transmitting computing device (510). In one example, a receiving (Rx) antenna 181 of the antenna module 180 of a receiving computing device can receive the wireless signal from a transmitting computing device. The preamble detect 111 can determine whether the received frame includes an Rx preamble 183, such as an I-FOP preamble of a shaped data frame (520). In one example, the preamble detect 111 can detect an I-FOP preamble based on at least three properties: (i) the set of sequences (e.g., ZC sequences) of the I-FOP preamble, (ii) the order of the sequences, and (iii) the arrival time of the set of sequences. The preamble detect 111 can detect the set of ZC sequences, for example, by searching all sub-bands of the operating bandwidth for the set of ZC sequences (e.g., by using prior negotiated information with the transmitting computing device). The ZC sequences (and the order of the ZC sequences) can address a flow of data frames that are to be received by the receiving computing device from the transmitting computing device.

The preamble detect 111 can also have information that identifies the order of the ZC sequences. The preamble detect 111 can find the ZC sequences, and the ZC sequences can also be identified to be in a particular order that matches the order of a known set of ZC sequences. The preamble detect 111 can also detect the ZC sequences based on the arrival time of the sequences on the different sub-bands. For example, where an I-FOP preamble was generated with four ZC sequences (P1 through P4) and transmitted on four sub-bands A, B, D, E from a transmitting computing device, the preamble detect 111 can search for each of P1 through P4 in each sub-band of the operating bandwidth in order to correlate each sub-band with one of the ZC sequences (P1 through P4). The preamble detect 111 can identify which ZC sequences to search for based on previously exchanged information or based on programmable information stored in a database of system 100.

If no I-FOP preamble is detected by the preamble detect 111, the received frame can be forwarded to the radio module of the receiving computing device without processing or reshaping the received frame (570). The lack of an I-FOP preamble indicates to receiving system 100 that the RF bandwidth of the received frame has not been shaped. On the other hand, if an I-Fop preamble is detected by the preamble detect 111, the preamble detect 111 can select the sub-bands that the correlation peaks are found on and provide the information to the frequency manage 120 (530).

The frequency manage 120 can cause the Rx shape 131 to adjust one or more components, such as the filters and/or modulators, in order to recover the data frame from the RF signal found on the selected sub-bands (540). Using the adjusted components and/or filters, the Rx shape 131 can recover the data frame (550). In one example, the Rx shape 131 can process the shaped frame in a similar manner as discussed with FIG. 3A, but in a reverse fashion (e.g., so that the modulation sinusoids are rearranged as compared to when the data frames are shaped to be transmitted). Once the data frame is recovered by the Rx shape 131 (e.g., is re-shaped back), the processed data frame is provided to the radio module 150 for further processing on the receiving computing device. The receiving system 100 can then continue receive additional frames from a transmitting device and process the frames in the manner discussed, if necessary.

Hardware Diagram

Figure 6:
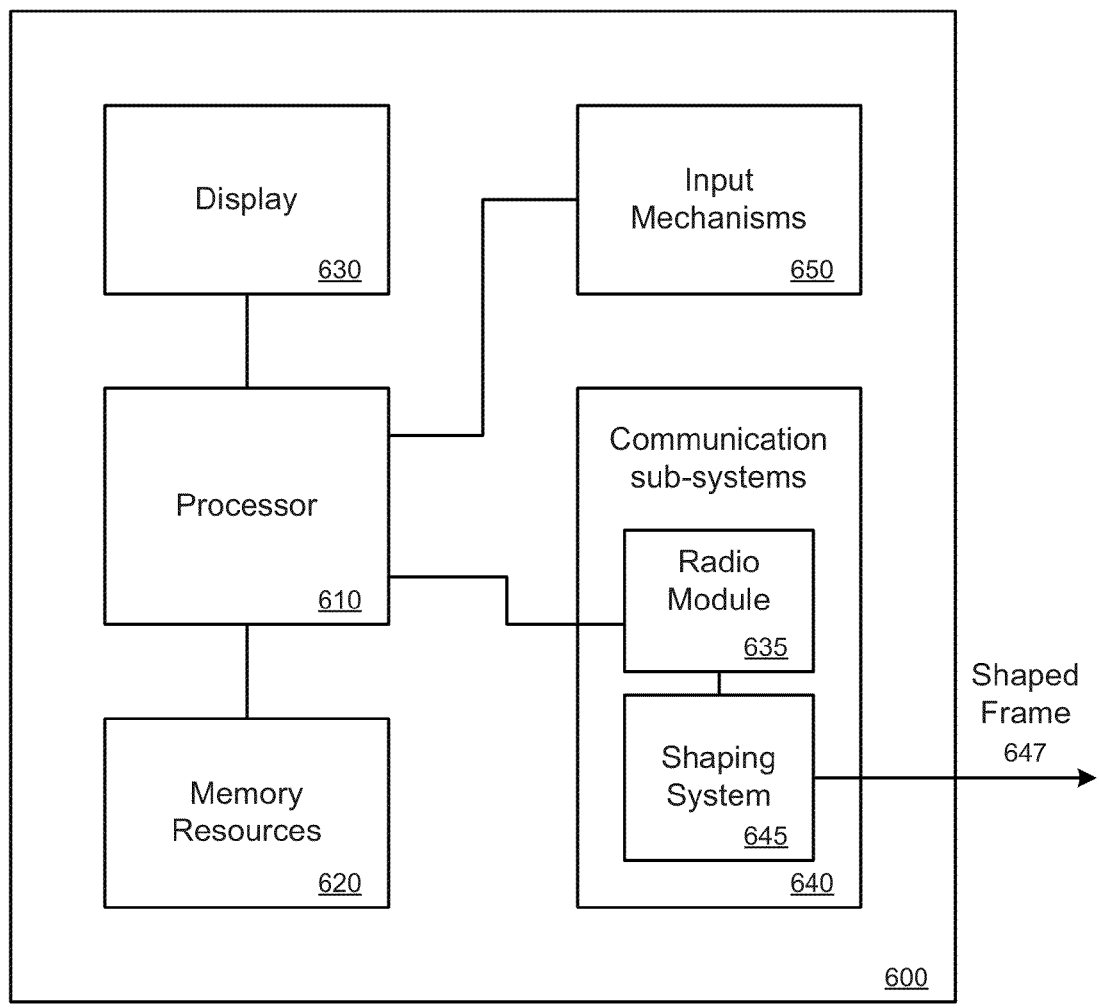
FIG. 6 is a block diagram that illustrates a computing device upon which examples described herein may be implemented.

FIG. 6 is a block diagram that illustrates a computing device upon which examples described herein may be implemented. According to some implementations, the computing device 600 can correspond to a desktop computer, laptop computer, mobile computing device (e.g., cellular device that is capable of telephony, messaging, and data services), tablet, laptop, netbook, media playback device, smart television, media playback device, projector, camera, printer, scanner or other network enabled device. The computing device 600 includes a processor 610, memory resources 620, a display device 630, one or more communication sub-systems 640, and input mechanism(s) 650. The communication sub-systems 640 can include network ports, such as wireline or wireless (e.g., cellular, Wi-Fi, etc.) communication ports for communicating with other devices. In one example, the communication sub-systems 640 can include a radio module 643 (e.g., a COTS radio device) coupled to a shaping system 645 (e.g., as discussed with respect to FIGS. 1 through 5).

The computing device 600 may operate an operating system to enable use of the various components of the device. Additionally, the computing device 600 can implement application level logic and programming. The memory 620 stores instructions for execution by processor 610. In one implementation, the processor 610 can run applications using instructions stored in memory 620. With reference to an example of FIG. 1, the processor 610 can provide data (e.g., such as data generated by the operating system or through the use of one or more applications) to be transmitted wirelessly by the communication sub-systems 640. The radio module 643 can process the data to be transmitted under an appropriate communication protocol. The shaping system 645 can shape the RF bandwidth of one or more frames of data that is to be transmitted via one or more antennas (not illustrated in FIG. 6) based on the detection of signal interference. The shaped frame(s) 647 can be transmitted wireless under a communication protocol. Accordingly, the shaping system 645 can be configured with software and/or other logic to perform one or more processes, steps and other functions provided with examples, such as described by FIGS. 1 through 5, as well as elsewhere in this document.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the examples are not limited to those precise descriptions and illustrations. Accordingly, it is contemplated that a particular feature described either individually or as part of an example can be combined with other individually described features, or parts of other examples, even if the other features and examples make no mentioned of the particular feature.

What is being claimed is:

1. A method for transmitting a wireless signal from a computing device, the method comprising:
    determining a radio frequency (RF) bandwidth in which a plurality of frames are to be transmitted by the computing device, the RF bandwidth being within an operating transmission bandwidth;
    detecting a signal interference that can interfere with transmission of the plurality of frames, the signal interference having an interference bandwidth that is within the RF bandwidth;
    in response to detecting the signal interference, transmitting a first data frame of the plurality of data frames as a first shaped data frame comprising a first set of sub-bands within the operating transmission bandwidth and not within the interference bandwidth, wherein the first set of sub-bands comprises discontiguous sub-bands; and
    in response to detecting a change in the signal interference or detecting additional signal interference, transmitting a second subsequent data frame of the plurality of data frames as a second shaped data frame comprising a second set of sub-bands within the operating transmission bandwidth and not within the interference bandwidth, wherein the second set of sub-bands comprises discontiguous sub-bands, the first set and the second set being different.

2. The method of claim 1, wherein detecting the signal interference includes monitoring for interference using a receiving antenna of the computing device.

3. The method of claim 1, wherein transmitting the first data frame includes processing the first data frame to generate the first shaped data frame, wherein processing the first data frame includes (i) copying a signal stream of the first data frame, and (ii) modulating the signal stream and the copy of the signal stream to align with a low-pass filter.

4. The method of claim 3, wherein processing the first data frame includes applying a low-pass filter to each of the modulated signal stream and the modulated copy of the signal stream.

5. The method of claim 4, wherein processing the first data frame includes (i) modulating the filtered signal stream and the filtered copy of the signal stream to create two sub-bands within the operating transmission bandwidth but not within the interference bandwidth, and (ii) combining the two sub-bands to generate the first shaped data frame.

6. The method of claim 4, wherein the low-pass filters are selected to divide a spectrum of the first data frame into one or more sub-bands with partially overlapping spectrum.

7. The method of claim 1, further comprising:
    generating a preamble to transmit with the first data frame to provide frequency information about the first data frame to a receiving device.

8. A computing device comprising:
    a radio module to provide a radio frequency signal;
    two or more antennas including a transmission antenna and a receiving antenna; and
    programmable hardware coupled to the radio module and the two or more antennas, the programmable hardware to implement:
        a frequency manager to (i) detect, via the receiving antenna, a signal interference that can interfere with transmission of a data frame, the signal interference having an interference bandwidth, and (ii) determine that the interference bandwidth is within a radio frequency (RF) bandwidth in which the data frame is to be transmitted, the RF bandwidth being within an operating transmission bandwidth;
        a frequency shaper to process the data frame to generate a shaped data frame, the shaped data frame comprising discontiguous frequency sub-bands within the operating transmission bandwidth and not within the interference bandwidth; and
        a transmitting module to transmit the shaped data frame via the transmission antenna.

9. The computing device of claim 8, wherein the frequency shaper processes the data frame by (i) copying a signal stream of the data frame, (ii) modulating each of the signal stream and the copy of the signal stream to align with a low-pass filter, (iii) applying a low-pass filter to each of the modulated signal stream and the modulated copy of the signal stream, (iv) modulating the filtered signal stream and the filtered copy of the signal stream to create two sub-bands within the operating transmission bandwidth but not within the interference bandwidth, and (v) combining the two sub-bands to generate a shaped data frame.

10. The computing device of claim 8, wherein the transmitting module generates a preamble to transmit with the shaped data frame to provide frequency information about the shaped data frame to a receiving device.

11. The computing device of claim 10, wherein the preamble is transmitted in a frequency bandwidth that is equal to a frequency bandwidth the shaped data frame is to be transmitted so that the preamble is transmitted within the operating transmission bandwidth but not within the interference bandwidth.

12. The computing device of claim 8, wherein the programmable hardware implements a receiving module to receive a preamble and a data frame transmitted from another computing device.

13. A method for transmitting a wireless signal from a computing device, the method comprising:
    determining a radio frequency (RF) bandwidth in which a data frame is to be transmitted by the computing device, the RF bandwidth being within an operating transmission bandwidth;

detecting a signal interference that can interfere with transmission of the data frame, the signal interference having an interference bandwidth that is within the RF bandwidth;

in response to detecting the signal interference, transmitting the data frame as a shafted data frame comprising a set of sub-bands within the operating transmission bandwidth and not within the interference bandwidth, wherein the set of sub-bands comprises discontiguous sub-bands.

* * * * *

UNITED STATES PATENT AND TRADEMARK OFFICE
CERTIFICATE OF CORRECTION

PATENT NO. : 9,001,927 B2
APPLICATION NO. : 13/755694
DATED : April 7, 2015
INVENTOR(S) : Eugene Chai et al.

It is certified that error appears in the above-identified patent and that said Letters Patent is hereby corrected as shown below:

In the Claims

In column 17, line 6, in Claim 13, delete "shafted" and insert -- shaped --, therefor.

Signed and Sealed this
Twenty-second Day of September, 2015

Michelle K. Lee
*Director of the United States Patent and Trademark Office*